US009226211B2

(12) United States Patent
Yeh et al.

(10) Patent No.: US 9,226,211 B2
(45) Date of Patent: Dec. 29, 2015

(54) CENTRALIZED PARTITIONING OF USER DEVICES IN A HETEROGENEOUS WIRELESS NETWORK

(71) Applicant: Intel IP Corporation, Santa Clara, CA (US)

(72) Inventors: Shu-Ping Yeh, New Taipei (TW); Nageen Himayat, Fremont, CA (US); Shilpa Talwar, Los Altos, CA (US)

(73) Assignee: Intel IP Corporation, Santa Clara, CA (US)

( * ) Notice: Subject to any disclaimer, the term of this patent is extended or adjusted under 35 U.S.C. 154(b) by 68 days.

(21) Appl. No.: 14/129,197

(22) PCT Filed: Aug. 26, 2013

(86) PCT No.: PCT/US2013/056666
§ 371 (c)(1),
(2) Date: Dec. 24, 2013

(87) PCT Pub. No.: WO2014/113072
PCT Pub. Date: Jul. 24, 2014

(65) Prior Publication Data
US 2015/0201374 A1     Jul. 16, 2015

Related U.S. Application Data

(60) Provisional application No. 61/753,914, filed on Jan. 17, 2013.

(51) Int. Cl.
*H04W 4/00*     (2009.01)
*H04W 36/22*    (2009.01)
(Continued)

(52) U.S. Cl.
CPC ............. *H04W 36/22* (2013.01); *H04L 1/1812* (2013.01); *H04L 5/0051* (2013.01); *H04L 5/0062* (2013.01); *H04L 5/14* (2013.01); *H04L 5/1469* (2013.01); *H04L 9/14* (2013.01); *H04L 63/30* (2013.01); *H04W 8/005* (2013.01); *H04W 12/04* (2013.01); *H04W 24/02* (2013.01); *H04W 24/10* (2013.01); *H04W 48/16* (2013.01); *H04W 48/20* (2013.01); *H04W 52/0251* (2013.01); *H04W 68/02* (2013.01); *H04W 72/042* (2013.01); *H04W 72/0413* (2013.01); *H04W 76/021* (2013.01); *H04W 76/023* (2013.01);
(Continued)

(58) Field of Classification Search
CPC ..... H04W 28/08; H04W 48/20; H04W 24/10; H04W 48/16
USPC ...................................................... 455/422.1
See application file for complete search history.

(56) References Cited

U.S. PATENT DOCUMENTS 7,403,505 B2 *   7/2008   Yoon et al. .................... 370/331
8,285,291 B2 *  10/2012   Dinan et al. .................. 455/443
(Continued)

OTHER PUBLICATIONS

International Search Report and Written Opinion mailed Dec. 13, 2013 from International Application No. PCT/US2013/056666.

*Primary Examiner* — Nathan Mitchell
(74) *Attorney, Agent, or Firm* — Schwabe, Williamson & Wyatt, P.C.

(57) ABSTRACT

Embodiments of the present disclosure describe devices, methods, computer-readable media and systems configurations for control of a heterogeneous wireless network. Embodiments described may improve upon one or more utility metrics of the heterogeneous network. Other embodiments may be described and claimed.

25 Claims, 5 Drawing Sheets

(51) Int. Cl.
| | |
|---|---|
| *H04L 5/00* | (2006.01) |
| *H04L 5/14* | (2006.01) |
| *H04W 52/02* | (2009.01) |
| *H04L 9/14* | (2006.01) |
| *H04W 12/04* | (2009.01) |
| *H04W 8/00* | (2009.01) |
| *H04W 76/02* | (2009.01) |
| *H04W 48/16* | (2009.01) |
| *H04W 48/20* | (2009.01) |
| *H04L 29/06* | (2006.01) |
| *H04W 24/02* | (2009.01) |
| *H04L 1/18* | (2006.01) |
| *H04W 72/04* | (2009.01) |
| *H04W 76/04* | (2009.01) |
| *H04W 24/10* | (2009.01) |
| *H04W 68/02* | (2009.01) |

(52) U.S. Cl.
CPC .......... *H04W76/046* (2013.01); *H04W 76/048* (2013.01); *H04L 2209/24* (2013.01); *H04L 2209/80* (2013.01)

(56) References Cited

U.S. PATENT DOCUMENTS

| | | | |
|---|---|---|---|
| 2002/0059434 A1* | 5/2002 | Karaoguz et al. | 709/228 |
| 2005/0176440 A1* | 8/2005 | Sang et al. | 455/453 |
| 2009/0069004 A1* | 3/2009 | Ergen et al. | 455/422.1 |
| 2009/0098861 A1* | 4/2009 | Kalliola et al. | 455/414.1 |
| 2009/0323530 A1* | 12/2009 | Trigui et al. | 370/235 |
| 2010/0029282 A1 | 2/2010 | Stamoulis et al. | |
| 2010/0075682 A1* | 3/2010 | del Rio-Romero et al. | 455/439 |
| 2010/0220630 A1* | 9/2010 | Kalika et al. | 370/254 |
| 2010/0238884 A1 | 9/2010 | Borran et al. | |
| 2011/0058478 A1* | 3/2011 | Krym et al. | 370/237 |
| 2011/0252477 A1* | 10/2011 | Sridhar et al. | 726/24 |
| 2012/0076025 A1 | 3/2012 | Barbieri et al. | |
| 2012/0088516 A1 | 4/2012 | Ji et al. | |
| 2012/0201158 A1 | 8/2012 | Geirhofer et al. | |
| 2012/0236717 A1* | 9/2012 | Saska et al. | 370/235 |
| 2013/0217407 A1* | 8/2013 | Gerlach et al. | 455/453 |
| 2013/0324076 A1* | 12/2013 | Harrang | 455/405 |
| 2014/0162629 A1* | 6/2014 | Tipton et al. | 455/423 |
| 2014/0162661 A1* | 6/2014 | Shaw et al. | 455/439 |
| 2014/0213277 A1* | 7/2014 | Jang | 455/453 |
| 2014/0274101 A1* | 9/2014 | Venkatesan | 455/453 |
| 2015/0087325 A1* | 3/2015 | Nuss et al. | 455/453 |

* cited by examiner

CENTRALIZED PARTITIONING OF USER DEVICES IN A HETEROGENEOUS WIRELESS NETWORK

CROSS REFERENCE TO RELATED APPLICATIONS

The present application is a national phase entry under 35 U.S.C. §371 of International Application No. PCT/US2013/056666, filed Aug. 26, 2013, entitled "CENTRALIZED PARTITIONING OF USER DEVICES IN A HETEROGENEOUS WIRELESS NETWORK", which designates the United States of America, and which claims priority to U.S. Provisional Patent Application No. 61/753,914, filed Jan. 17, 2013, entitled "Advanced Wireless Communication Systems and Techniques," the entire disclosure of which is hereby incorporated by reference in its entirety.

FIELD

Embodiments of the present invention relate generally to the field of wireless communications, and more particularly, to central control of a wireless network.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Wireless networks are becoming increasingly heterogeneous (HetNets) and may consist of a mix of infrastructure elements and user devices capable of interacting over multiple radio access technologies (RATs). Some HetNet architectures may be characterized as a multi-tier, multi-RAT HetNet, where a tier of small cell stations, supporting multiple RATs, may be overlaid on top of a conventional macro cellular deployment to augment capacity of the HetNet. The small cells may integrate both cellular air interfaces and WiFi interfaces. Association of a user device with a cell and RAT of a HetNet may be performed by the user device which may determine downlink carrier signal strengths and signal-to-noise-ratios (SNRs) of nearby cell stations. Based upon this information the user device may determine which base station and RAT with which to associate. This type of association is limited to the information available to the individual user device and cannot account for the number and mix of other user devices on the base station and RAT.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Illustrative embodiments of the present disclosure include, but are not limited to, methods, computer-readable media and apparatuses for central control of a heterogeneous wireless network. Embodiments described may improve upon one or more utility metrics of the heterogeneous network.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise.

The phrase "A and/or B" means (A), (B), or (A and B). The phrases "A/B" and "A or B" mean (A), (B), or (A and B), similar to the phrase "A and/or B."

As used herein, the term "module" refers to, is part of, or includes hardware components such as an Application Specific Integrated Circuit (ASIC), an electronic circuit, a logic circuit, a processor (shared, dedicated, or group) and/or memory (shared, dedicated, or group) that are configured to provide the described functionality. In some embodiments, the module may execute one or more software or firmware programs to provide at least some of the described functionality.

Figure 1:
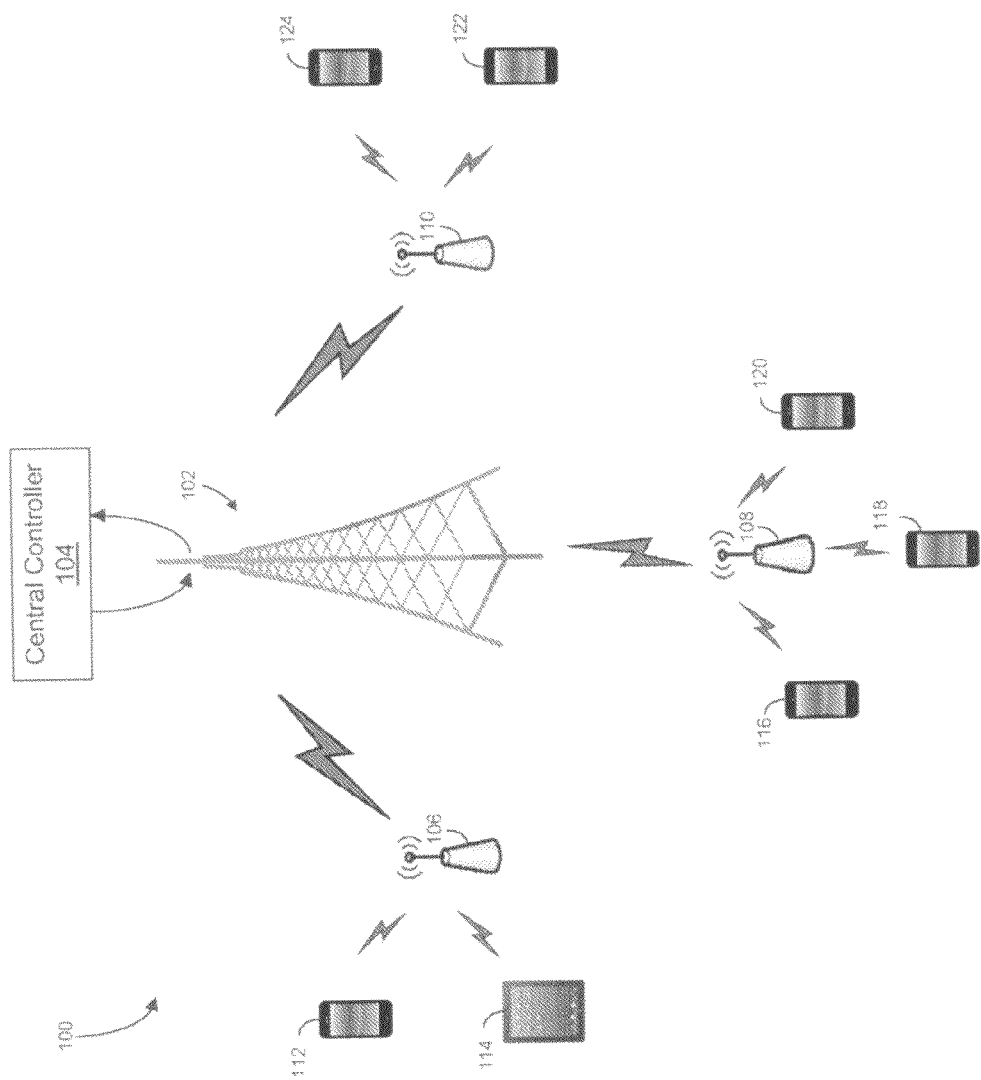
FIG. 1 schematically illustrates a heterogeneous wireless network in accordance with various embodiments of the present disclosure.

FIG. 1 schematically illustrates a heterogeneous wireless network (HetNet) 100 in accordance with various embodiments. HetNet 100 may include a macro base station (MBS) 102 which may be, for example, a Node B or Evolved Node B. MBS 102 may be wirelessly coupled with cooperating cell stations (CCSs) 106-110. CCSs may include, for example, picocells, femtocells, microcells, or any combination thereof. In embodiments, CCSs may also include macro cell stations, such as MBS 102; however, for ease of description, MBS 102 is referred to separately from CCSs 106-110. CCSs 106-110 may support a number of radio access technologies (RATs), such as, for example, 4G, Long-term evolution (LTE), WiFi, 3G, or any combination thereof. CCSs 106-110 may be coupled wirelessly with user devices 112-124 via the supported RATs. MBS 102 may, by way of CCSs 106-110, provide user devices 112-124 with a connection to a core network, not depicted herein.

In embodiments, HetNet 100 may include central controller 104. Central controller 104 may be configured to receive utility measurements related to one or more utility metrics of the HetNet. In embodiments, CCSs 106-110 may be configured to collect and transmit the utility measurements to central controller 104. Central controller 104 may utilize the utility measurements to determine an overall utility of HetNet 100 and may further utilize the utility measurements to determine a partitioning of user devices 112-124 across HetNet 100 that may improve upon the overall utility of HetNet 100. Central controller 104 may then transmit partition information via CCSs 106-110 to the user devices to accomplish the determined partitioning. In embodiments, partition information may include a specific CCS and RAT assignment for the user devices. In other embodiments, partition information may include network-assisting information configured to enable the user devices to enable the user devices to accomplish the determined partitioning. The partitioning of the user devices is discussed in greater detail in reference to FIGS. 2 and 3, below. The one or more utility metrics may include, but are not limited to, channel quality, loading and/or congestion level, quality of service (QoS) requirements, or any combination thereof. In some embodiments, central controller 104 may be incorporated into MBS 102, the core network, or other suitable portion of a telecommunications network.

In some embodiments, HetNet 100 may be a macro-assisted HetNet, such as a 3rd Generation Partnership Project (3GPP) macro-assisted HetNET. In these embodiments, utility management may be performed by MBS 102 and, as a result, MBS 102 may transmit partition information directly to the user devices while cell stations, such as CCSs 106-110, may be utilized for data offloading and high-data rate transmission.

In embodiments, HetNet 100 may be considered a cooperating set. The utility of a cooperating set may be represented as a function of the utilities of the individual components of the cooperating set. For example, consider a cooperating set with K cell stations, k=1, . . . , K. These cell stations may include all MBSs and/or CCSs of the cooperating set. Each station may support multiple RATs for transmission such that $r_k$ represents the number of rats supported by station k. The set of user devices to be served by stations within the cooperating set may be denoted as $S^{sys}$. The user devices may be enumerated as u=1, 2, . . . , N, where N=$|S^{sys}|$. The set of user devices served by station k may be denoted as $S_k$ and the set of user devices served by the $r^{th}$ RAT of station k may be denoted as $S_{k,r}$. The following relationships hold: $S_k = U_{r=1}^{r_k} S_{k,r}$ and $S^{sys} = U_{k=1}^{K} S_k$ where $S_k$'s are mutually exclusive and $S_{k,r}$'s are mutually exclusive. Overall utility of the cooperating set may be represented as a function of utilities from all stations within the cooperating set, all RATs of the cooperating cell stations, or all user devices served by the cooperating set. The utility representation of the cooperating set may therefore be represented as $U^{sys} = f_c(U_1, U_2, \ldots, U_K) = f_r(U_{1,1}, \ldots, U_{1,r_1}, U_{2,1}, \ldots, U_{2,r_2}, U_{K,1}, \ldots, U_{K,r_K}) = f_u(u_1, u_2, \ldots, u_N)$, where $U_k$ is the utility of cell station k, $U_{k,r}$ is the utility of the $r^{th}$ RAT of cell station k, and $u_i$ is the utility of user device i. The overall utility as a function of utilities across all cell stations is represented by $f_c$, while the overall utility as a function of utilities across all RATs is represented by $f_r$, and $f_u$ represents the overall utility as a function of utilities across all user devices. Therefore, the overall utility of HetNet 100 may be represented as $U^{100} = f_c(U_{102}, U_{106}, U_{108}, U_{110}) = f_u(u_{112}, u_{114}, u_{116}, u_{118}, u_{120}, u_{122}, u_{124})$, were the superscript and subscripts represent the reference numbers of FIG. 1. For the sake of simplicity, $f_r$ is not depicted here, however, one of ordinary skill in the art would readily be able to determine $f_r$ utilizing the equations above and taking into account the RATs supported in the cooperating set.

Figure 2:
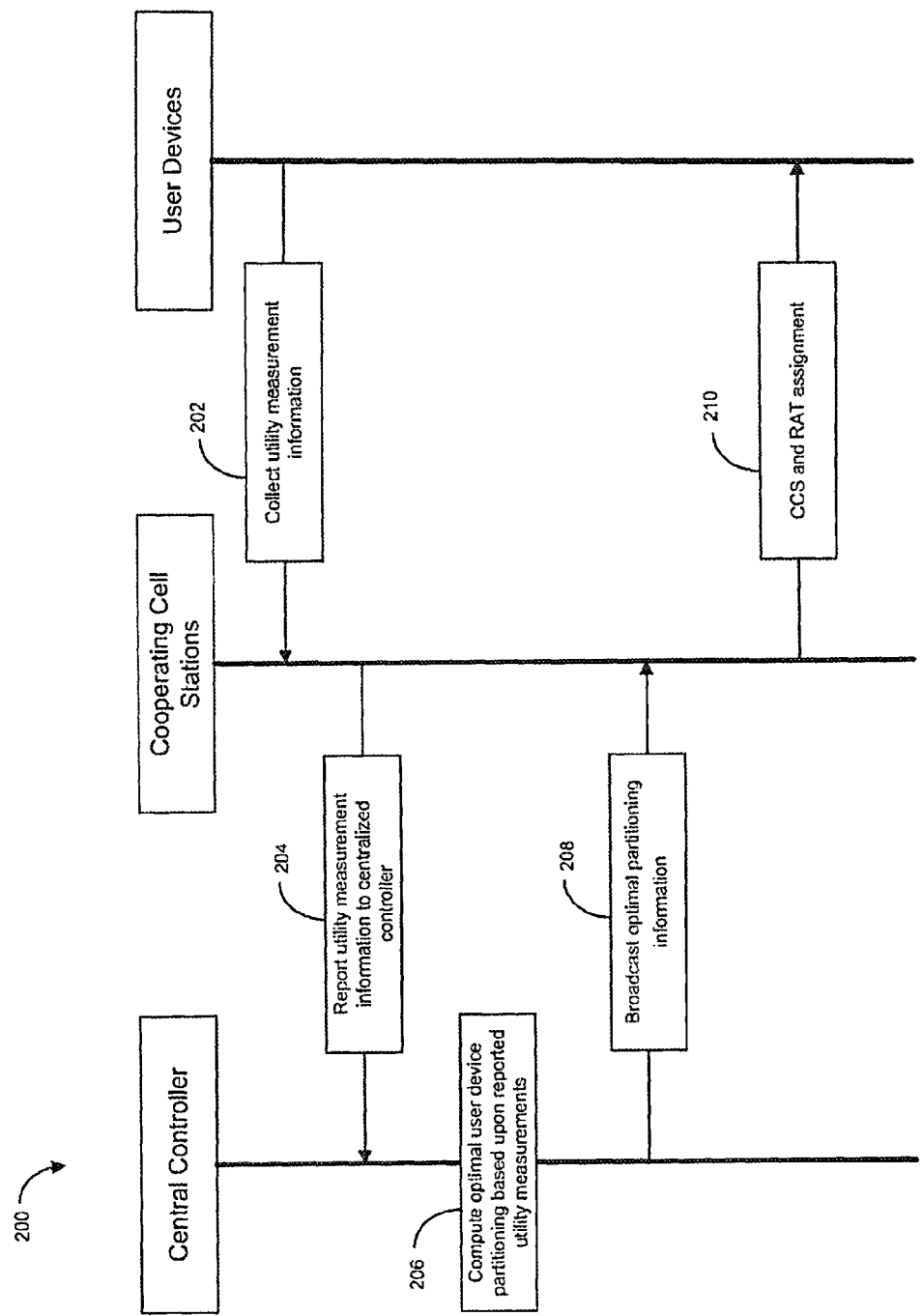
FIG. 2 illustrates a method of partitioning user devices of a heterogeneous wireless network in accordance with various embodiments of the present disclosure.

FIG. 2 illustrates a method 200 of partitioning user devices of a heterogeneous wireless network (HetNet) in accordance with various embodiments. The method may begin at block 202 where cooperating cell stations (CCSs) of a cooperating set, e.g., CCSs 106-110 of FIG. 1, may collect utility measurement information from user devices, e.g., user devices 112-124 of FIG. 1. In some embodiments, the collection of the utility measurement information may be accomplished by monitoring a radio link between the CCS and the user device. In such embodiments, it may be desirable to have all user devices of the cooperating set active on the RATs supported by the individual user devices in order to collect sufficient utility measurement information. In embodiments, the CCSs may be configured to collect, for example, the utility measurement information at predetermined intervals, upon receiving a request from the central controller, and/or upon occurrence of an event, such as a connection to or disconnection from a user device. In other embodiments, the user devices may be configured to collect utility measurement information and report the utility measurement information to the CCS to which the user device is connected. In such embodiments, the user devices may be configured to transmit the utility measurement information at predetermined intervals, upon receiving a request from the CCS, and/or when a utility measurement drops below a certain threshold.

In embodiments, there may be overhead associated with the collection of utility measurement information which may include the period of time it may take to collect the actual utility measurement information, in addition to the period of time it may take to transmit the appropriate messages to the central controller. This overhead may increase as the number of RATs and/or number of CCSs increases. In embodiments, this overhead may be reduced by allowing only the strongest CCS of one rat to collect the RAT measurement for each user device. Therefore, a user device may only report to one CCS for each RAT it supports which may reduce the amount of time and number of messages to collect the utility measurement information.

In block 204 the CCSs may report the collected utility measurement information to a central controller. This utility measurement information may be utilized by the central controller to determine the overall utility of the cooperating set. In block 206, the central controller may then utilize the utility measurement information to determine a partitioning of the user devices across the CCSs and available RATs to improve upon one or more utility metrics of the cooperating set. In some embodiments, the central controller may calculate an optimized distribution which would result in an optimization of the utility metric, as opposed to simply an improvement.

For example, the user device partitioning determination may be based on maximizing sum log throughput in static network. In this scenario the utility objective may be expressed as:

$$U^{sys} = \sum_{k=1}^{K} U_k = \sum_{k=1}^{K} \sum_{i \in S_k} \log TP_i$$

$$= \sum_{k=1}^{K} \sum_{r=1}^{r_k} U_{k,r} = \sum_{k=1}^{K} \sum_{r=1}^{r_k} \sum_{i \in S_{k,r}} \log TP_i$$

$$= \sum_{i=1}^{N} \log TP_i$$

Here $TP_i$ represents to the throughput of user device i. All other variables are discussed above in reference to FIG. 1.

The constraint of each user device being assigned to one single RAT of a cell station can be relaxed by introducing the variable $x_{i,(k,r)}$ representing the percentage of resources the $r^{th}$ RAT of cell station k assigns to user device i. The mutually exclusive constraint on $S_{k,r}$'s implies that $x_{i,(k,r)}$ can only be non-zero at one of the (k,r) pairs. However, this restraint will be removed in the following formulations which only assume $0 \leq x_{i,(k,r)} \leq 1$ and $\Sigma_{i=1}^{N} x_{i,(k,r)} = 1$. For solutions with more than one (cell, RAT) pair being selected by one user device, we can translate $x_{i,(k,r)}$ number into a probability and assign the user device to one of the (cell, RAT) pairs with a nonzero $x_{i,(k,r)}$ according to the corresponding probabilities. The optimization problem can then be written as:

$$\max U^{sys} = \sum_{i=1}^{N} \log TP_i$$

such that $$\sum_{k=1}^{K} \sum_{r=1}^{r_k} x_{i,(k,r)} R_{i,(k,r)} = TP_i, \forall i$$

$$\sum_{i=1}^{N} x_{i,(k,r)} \leq 1, \forall (k,r)$$

$$0 \leq x_{i,(k,r)} \leq 1, \forall i, (k,r)$$

The problem above is a convex problem and may be solved via convex optimization toolboxes to determine the optimal partitioning of user devices across the HetNet.

Another example would be to maximize the per user throughput in a static network. In this example the network user partitioning decision may be based on maximizing the minimum of per user throughput in a static network. The utility objective can be expressed as:

$$U^{sys} = \min_{k=1,\ldots,K} U_k = \min_{k=1,\ldots,K} \min_{i \in S_k} TP_i$$

$$= \min_{k=1,\ldots,K} \min_{r=1,r_k} U_{k,r} = \min_{k=1,\ldots,K} \min_{r=1,\ldots,r_k} \min_{i \in S_{k,r}} TP_i$$

$$= \min_{i=1,\ldots,N} TP_i$$

Again, we may relax the constraint that each user device may only be assigned to one single RAT of a cell station by introducing the variable $x_{i,(k,r)}$ representing the percentage of resource the $r^{th}$ RAT of cell station K assigns to user device i. The optimization problem may then be written as:

$$\max R_{min}$$

such that $$\sum_{k=1}^{K} \sum_{r=1}^{r_k} x_{i,(k,r)} R_{i,(k,r)} \geq R_{min}, \forall i$$

$$\sum_{i=1}^{N} x_{i,(k,r)} \leq 1, \forall (k,r)$$

$$0 \leq x_{i,(k,r)} \leq 1, \forall i, (k,r)$$

This problem is a linear optimization problem and may be solved utilizing linear programming to determine the optimal partitioning of user devices across the HetNet.

The above optimization examples are meant to be merely illustrative of possible optimization scenarios and are not meant to limit this disclosure. It will be appreciated that there are many other possible optimization scenarios and this disclosure would be equally applicable to any such optimization scenario.

In block 208 the central controller may transmit the optimal partitioning information, derived, for example, through the optimization problems above, to the CCSs which may in turn transmit the CCS and RAT assignment to the individual user devices in block 210. The individual user devices would then use this assignment to establish a wireless connection with the assigned CCS on the assigned RAT.

Figure 3:
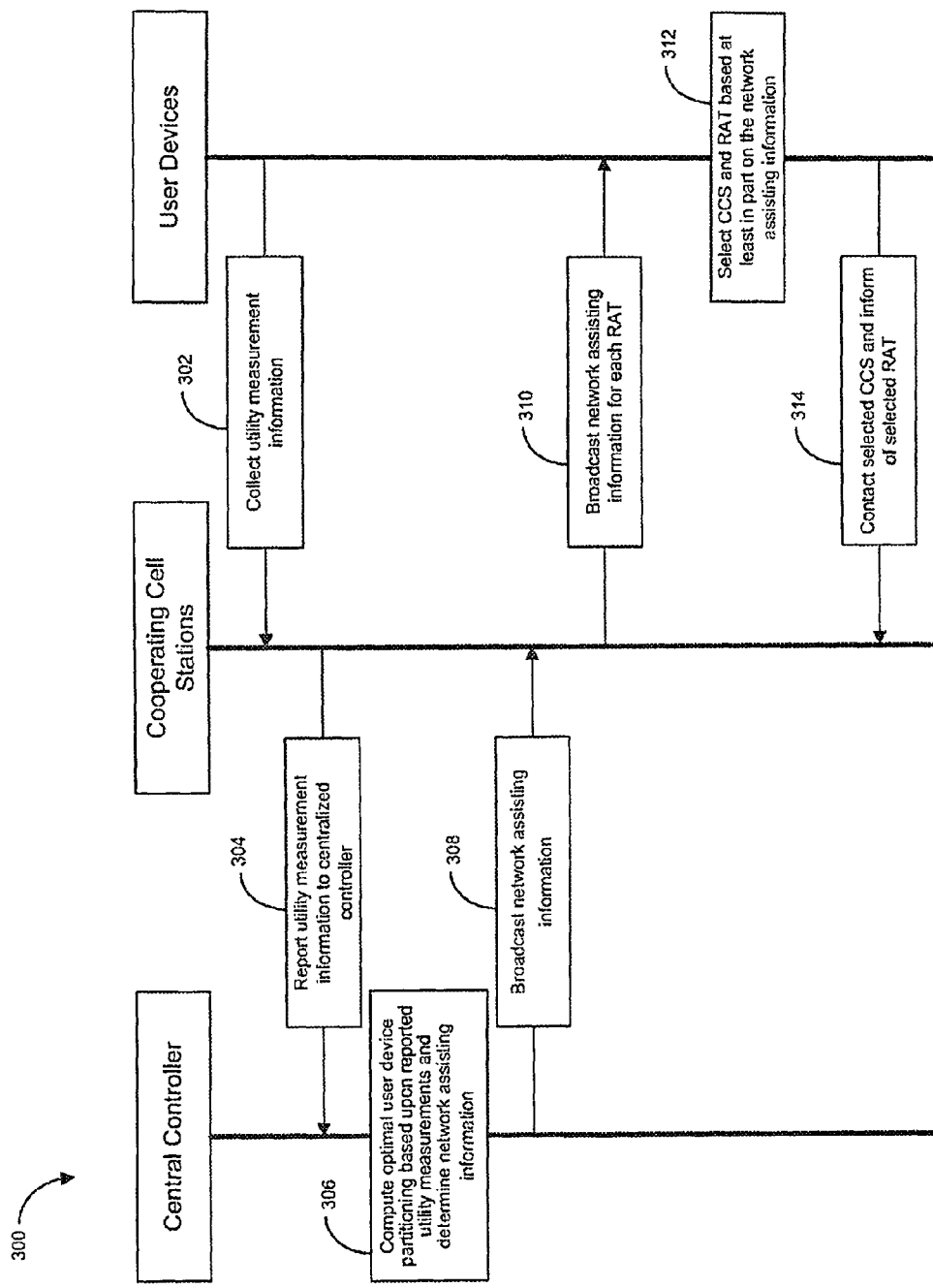
FIG. 3 illustrates another method of partitioning user devices of a heterogeneous wireless network in accordance with various embodiments of the present disclosure.

FIG. 3 illustrates a method 300 of partitioning user devices of a heterogeneous wireless network (HetNet) in accordance with various embodiments of the present disclosure. The method begins by carrying out monitoring and reporting of utility measurement information in blocks 302 and 304, these processes may be carried out in the same manner as that described in reference to blocks 202 and 204 of FIG. 2, respectively.

In block 306, the central controller may then utilize the utility measurement information to determine a partitioning of the user devices across the CCSs and available RATs of the HetNet to improve upon one or more utility metrics of the cooperating set. In some embodiments, the central controller may calculate an optimized distribution and determine network-assisting information to enable the user devices of the cooperating set to carry out the optimized partitioning. For example, network-assisting info may be a price associated with RATs supported by a cooperating cell station. It will be appreciated that price is used herein merely as an example and that any other preference indicator may be utilized such as, but not limited to, a weight or priority. The price indicator of the RAT may be dependent upon the utility sought to be improved. For instance, if the utility metric of concern is the loading of a RAT in a CCS the loading of a radio link of the RAT may be utilized in determining the preference indicator to assign to the RAT. In such instances a radio link with a higher load may have a higher price associated while those with lower loads would have a lower price. In another instance the average delay of a radio link of the RAT in a CCS may be the utility metric sought to be improved upon. In such instances, the average delay value may be utilized in determining a price associated with the RAT, for example, a higher delay may result in a higher cost while a lower delay may result in a lower cost.

Returning to the optimization examples discussed above in reference to FIG. 2, if the utility sought to be improved upon is maximum sum log throughput in a static network, the optimization problem may be represented in the same manner as it was above:

$$\max U^{sys} = \sum_{i=1}^{N} \log TP_i$$

such that $$\sum_{k=1}^{K} \sum_{r=1}^{r_k} x_{i,(k,r)} R_{i,(k,r)} = TP_i, \forall i$$

$$\sum_{i=1}^{N} x_{i,(k,r)} \leq 1, \forall (k,r)$$

$$0 \leq x_{i,(k,r)} \leq 1, \forall i, (k,r)$$

From this problem the Lagrange dual may be represented as:

$$\max \sum_i \log \mu_i + N - \sum_{k=1}^{K} \sum_{r=1}^{r_k} \lambda_{(k,r)}$$

such that $\lambda_{(k,r)} \geq \mu_i R_{i,(k,r)} \forall i, (k, r)$ $\mu_i > 0 \ \forall i$ Where $\lambda_{(k,r)}$ is the Lagrange multiplier which corresponds to the constraint $\Sigma_{i=1} x_{i,(k,r)} \leq 1$, and $\mu_i$ is the Lagrange multiplier which corresponds with the constraint $\Sigma_{k=1}^{K} \Sigma_{r=1}^{r_k} x_{i,(k,r)} R_{i,(k,r)} = TP_i$. From the Karush-Kuh-Tucker (KKT) conditions, we know that if $x_{i,(k,r)} > 0$, then $\lambda_{(k,r)} = \mu_i R_{i,(k,r)}$, and, if $\lambda_{(k,r)} > \mu_i R_{i,(k,r)}$ then $x_{i,(k,r)} = 0$. For each user device, the values of $$\frac{R_{i,(k,r)}}{\lambda_{(k,r)}}$$

for all RATs may be used as the metric for cell/RAT selection. For two (cell, RAT) pairs with $$\frac{R_{i,(k,r)}}{\lambda_{(k,r)}} < \frac{R_{i,(k',r')}}{\lambda_{(k',r')}},$$

we can conclude that $x_{i,(k,r)} = 0$ since $$\frac{R_{i,(k,r)}}{\lambda_{(k,r)}} < \frac{R_{i,(k',r')}}{\lambda_{(k',r')}} \leq \frac{1}{\mu_i} \leftrightarrow \lambda_{(k,r)} > \mu_i R_{i,(k,r)}.$$

Therefore, $\lambda_{(k,r)}$ may be used as the network-assisting information for the $r^{th}$ RAT of cell station k. This network-assisting information is the ratio of the optimal load on each cell.

If the utility sought to be improved upon is minimum per user throughput in a static network, the optimization problem may be represented as:

max $R_{min}$ such that $$\sum_{k=1}^{K} \sum_{r=1}^{r_k} x_{i,(k,r)} R_{i,(k,r)} \geq R_{min}, \forall i$$

$$\sum_{i=1}^{N} x_{i,(k,r)} \leq 1, \forall (k, r)$$

$0 \leq x_{i,(k,r)} \leq 1, \forall i, (k, r)$

From this optimization problem the Lagrange dual problem may be represented as:

$$\min \sum_{k=1}^{K} \sum_{r=1}^{r_k} \lambda_{(k,r)}$$

s.t. $\sum_i \mu_i = 1$ $\lambda_{(k,r)} \geq \mu_i R_{i,(k,r)}, \forall i, (k, r)$ $\mu_i \geq 0, \lambda_{(k,r)} \geq 0, \forall i, (k, r),$ $$\sum_{k=1}^{K} \sum_{r=1}^{r_k} x_{i,(k,r)} R_{i,(k,r)} \geq R_{min}$$

Note, that the same KKT conditions as in the max sum log rate example above also hold here. Therefore we can also use $\lambda_{(k,r)}$ as the network-assisting information for the $r^{th}$ RAT of CCS k.

The above optimization examples are meant to be merely illustrative of possible optimization scenarios and are not meant to limiting of this disclosure. It will be appreciated that there are many other possible optimization scenarios and this disclosure would apply equally to those optimization scenarios.

Once network-assisting information, such as that discussed above, has been determined, it may be broadcast by the central controller to the CCSs in block 308. The network assisting information for the RATs of the respective CCSs may then be transmitted to the user devices in block 310. In block 312 the user devices may utilize the network assisting information to determine an appropriate CCS and RAT with which to connect and may, in block 314, notify the determined CCS of the selected RAT.

Figure 4:
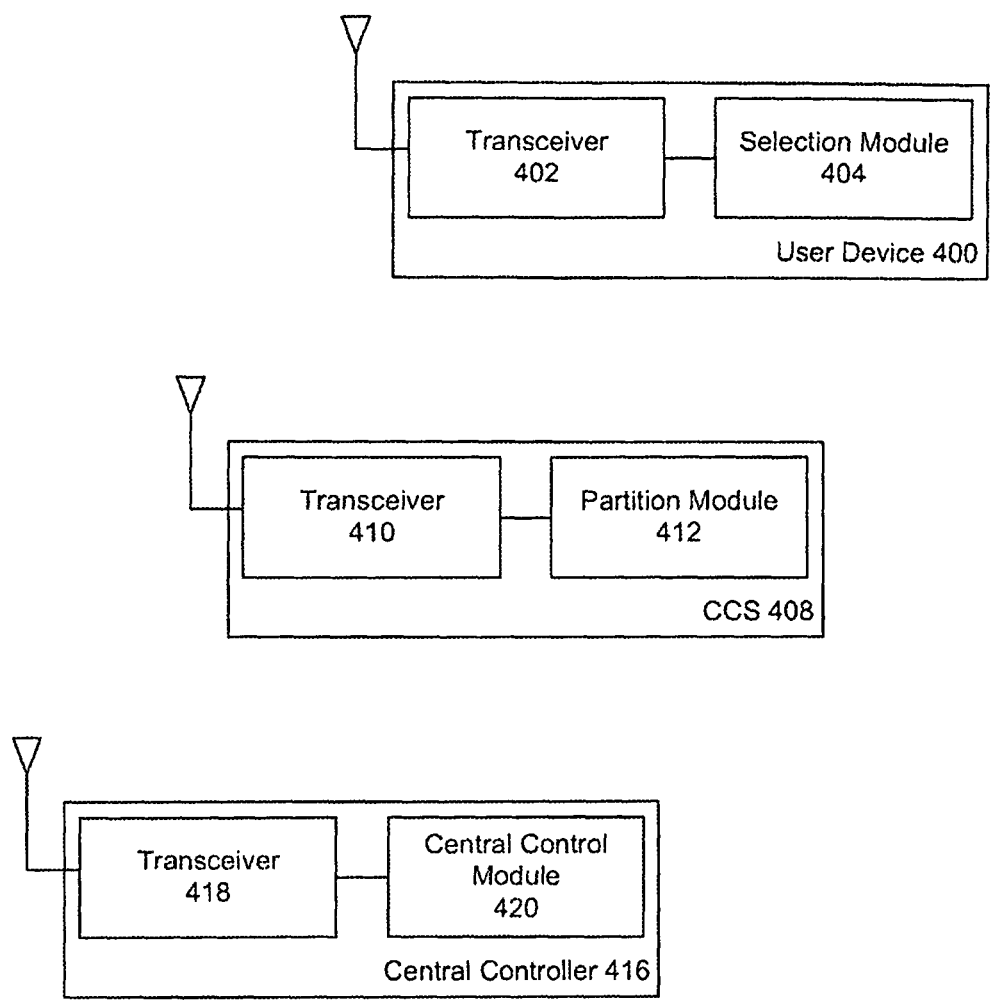
FIG. 4 schematically illustrates a user device, cooperating cell station and central controller in accordance with various embodiments of the present disclosure.

FIG. 4 schematically illustrates a user device 400, CCS 408 and central controller 416 in accordance with various embodiments of the present disclosure. User device 400 may include transceiver 402 coupled with selection module 404. Selection module 404 may be configured with logic to perform any of the processes described herein with respect to a user device. CCS 408 may include transceiver 410 coupled with partition module 412. Partition module 412 may be configured with logic to perform any of the processes described herein with respect to a CCS. Central controller 416 may include transceiver 418 coupled with central control module 420. Central control module 420 may be configured with logic to perform any of the processes described herein with respect to a central controller. Selection module 404, partition module 412, and central control module 420 may include hardware, software, and/or firmware components that may or may not be explicitly shown in FIG. 4.

Figure 5:
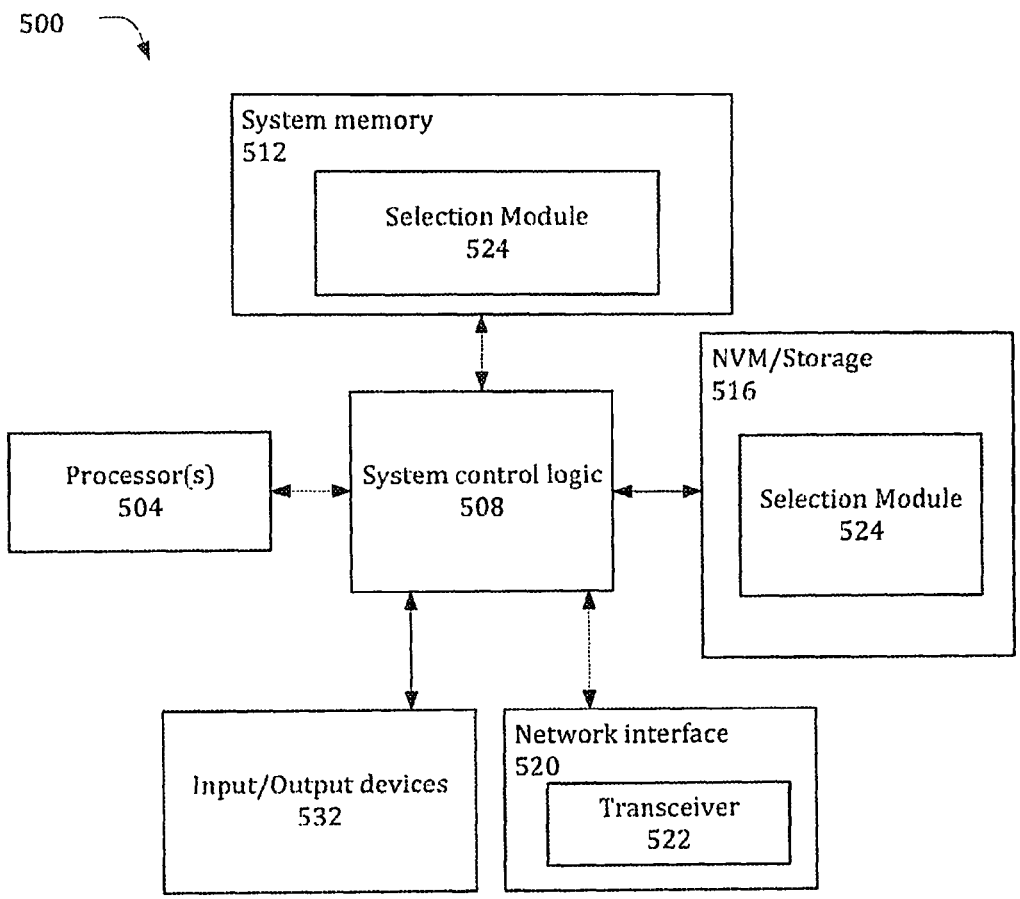
FIG. 5 schematically depicts an example system in accordance with various embodiments of the present disclosure.

The user device described herein may be implemented into a system using any suitable hardware and/or software to configure as desired. FIG. 5 illustrates, for one embodiment, an example system 500 comprising one or more processor(s) 504, system control logic 508 coupled with at least one of the processor(s) 504, system memory 512 coupled with system control logic 508, non-volatile memory (NVM)/storage 516 coupled with system control logic 508, a network interface 520 coupled with system control logic 508, and input/output (I/O) devices 532 coupled with system control logic 508.

The processor(s) 504 may include one or more single-core or multi-core processors. The processor(s) 504 may include any combination of general-purpose processors and dedicated processors (e.g., graphics processors, application processors, baseband processors, etc.).

System control logic 508 for one embodiment may include any suitable interface controllers to provide for any suitable interface to at least one of the processor(s) 504 and/or to any suitable device or component in communication with system control logic 508.

System control logic 508 for one embodiment may include one or more memory controller(s) to provide an interface to system memory 512. System memory 512 may be used to load and store data and/or instructions, e.g., selection module 524. System memory 512 for one embodiment may include any suitable volatile memory, such as suitable dynamic random access memory (DRAM), for example.

NVM/storage 516 may include one or more tangible, non-transitory computer-readable media used to store data and/or instructions, e.g., selection module 524. NVM/storage 516 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 516 may include a storage resource physically part of a device on which the system 500 is installed or it may be accessible by, but not necessarily a part of, the device. For example, the NVM/storage 516 may be accessed over a network via the network interface 520 and/or over Input/Output (I/O) devices 532.

The selection module 524 may include instructions that, when executed by one or more of the processors 504, cause the system 500 to perform the methods described in reference to FIGS. 2 and 3 above. In various embodiments, the selection module 524 may include hardware, software, and/or firmware components that may or may not be explicitly shown in system 500.

Network interface 520 may have a transceiver 522 to provide a radio interface for system 500 to communicate over one or more network(s) and/or with any other suitable device. In various embodiments, the transceiver 522 may be integrated with other components of system 500. For example, the transceiver 522 may include a processor of the processor(s) 504, memory of the system memory 512, and NVM/Storage of NVM/Storage 516. Network interface 520 may include any suitable hardware and/or firmware. Network interface 520 may include a plurality of antennas to provide a multiple input, multiple output radio interfaces. Network interface 520 for one embodiment may include, for example, a wired network adapter, a wireless network adapter, a telephone modem, and/or a wireless modem.

For one embodiment, at least one of the processor(s) 504 may be packaged together with logic for one or more controller(s) of system control logic 508. For one embodiment, at least one of the processor(s) 504 may be packaged together with logic for one or more controllers of system control logic 508 to form a System in Package (SiP). For one embodiment, at least one of the processor(s) 504 may be integrated on the same die with logic for one or more controller(s) of system control logic 508. For one embodiment, at least one of the processor(s) 504 may be integrated on the same die with logic for one or more controller(s) of system control logic 508 to form a System on Chip (SoC).

In various embodiments, the I/O devices 532 may include user interfaces designed to enable user interaction with the system 500, peripheral component interfaces designed to enable peripheral component interaction with the system 500, and/or sensors designed to determine environmental conditions and/or location information related to the system 500.

In various embodiments, the user interfaces could include, but are not limited to, a display (e.g., a liquid crystal display, a touch screen display, etc.), speakers, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, a universal serial bus (USB) port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 520 to communicate with components of a positioning network, e.g., a global positioning system (GPS) satellite.

In various embodiments, the system 500 may be a mobile computing device such as, but not limited to, a laptop computing device, a tablet computing device, a netbook, a smartphone, etc. In various embodiments, system 500 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

Some non-limiting examples are provided below.

Example 1 is an apparatus comprising: a wireless transceiver; and a control module coupled with the wireless transceiver, the control module to: receive utility measurements from a plurality of cooperating cell stations (CCSs) of a heterogeneous wireless network, wherein the utility measurements are associated with a plurality of user devices that wirelessly connect to the plurality of CCSs; determine, based upon the utility measurements, partition information that results in a partitioning of the user devices across the plurality of CCSs and a plurality of radio access technologies (RATs) associated with the plurality of CCSs to improve one or more utility metrics of the heterogeneous wireless network; and transmit the partition information to the user devices to partition the user devices.

Example 2 may include the subject matter of Example 1, wherein the partition information comprises assignment of each user device to a CCS and an associated RAT.

Example 3 may include the subject matter of Example 2, wherein the control module is to transmit the partition information to the user devices, through the plurality of CCSs, to partition the user devices.

Example 4 may include the subject matter of Example 1, wherein the partition information comprises network-assisting information to enable individual user devices to select a CCS and an associated RAT to partition the user devices in accordance with the partitioning.

Example 5 may include the subject matter of Example 4, wherein the network-assisting information includes a cost associated with each CCS and each associated RAT.

Example 6 may include the subject matter of Example 1, wherein the one or more utility metrics are associated with one or more of channel quality, loading level, congestion level, and quality of service (QoS) requirements.

Example 7 may include the subject matter of Example 1, wherein the one or more utility metrics are associated with increasing sum log throughput or increasing the minimum per user device throughput.

Example 8 may include the subject matter of Example 1, wherein the CCSs are selected from a group consisting of a picocell, femtocell, microcell, or macrocell.

Example 9 may include the subject matter of Example 1, wherein the RATs are selected from a group consisting of 4G, Long-term evolution (LTE), WiFi, and 3G.

Example 10 is a computer-implemented method comprising: transmitting, by a controller, a wireless signal to instruct a plurality of cooperating cell stations (CCS) of a heterogeneous wireless network to gather utility measurements associated with a plurality of user devices wirelessly connected to the plurality of CCS; receiving, by the controller, the utility measurements from the plurality of CCSs; determining, by the controller, based upon the utility measurements, assignments of the plurality of user devices to respective CCSs and associated radio access technologies (RATs) to improve one or more utility metrics of the heterogeneous wireless network; and transmitting, by the controller, the assignments to the plurality of user devices.

Example 11 may include the subject matter of Example 10, wherein the one or more utility metrics are associated with one or more of channel quality, loading level, congestion level, and quality of service (QoS) requirements.

Example 12 may include the subject matter of Example 10, wherein the one or more utility metrics are associated with increasing sum log throughput or increasing the minimum per user device throughput.

Example 13 may include the subject matter of Example 10, wherein the CCSs are selected from a group consisting of a picocell, femtocell, microcell, and macrocell.

Example 14 may include the subject matter of Example 10, wherein the RATs are selected from a group consisting of 4G, Long-term evolution (LTE), WiFi, and 3G.

Example 15 is a cooperating cell station (CCS) comprising: a wireless transceiver; and a partition module coupled with the wireless transceiver, the partition module to: collect utility measurement information from one or more user devices wirelessly connected to the CCS via one or more radio access technologies (RATs), the utility measurement information associated with one or more utility metrics of a heterogeneous wireless network (HetNet) to which the CCS is wirelessly connected; transmit the utility measurements to a controller of the HetNet to be combined with utility measurements from one or more other CCSs of the HetNet; receive, from the controller, partition information associated with the one or more user devices wirelessly connected to the CCS, the partition information configured to improve one or more utility metrics of the HetNet; and forward the partition information to the one or more user devices.

Example 16 may include the subject matter of Example 15, wherein the CCS is further to monitor one or more radio links respectively connecting the CCS to the one or more user devices to enable the collection of utility measurements.

Example 17 may include the subject matter of Example 15, wherein the partition information comprises assignment of the one or more user devices to a CCS and an associated RAT of the heterogeneous network.

Example 18 may include the subject matter of Example 15, wherein the partition information comprises network-assisting information to enable the one or more user devices to select a CCS and an associated RAT to partition the user devices in accordance with the partitioning.

Example 19 may include the subject matter of Example 18, wherein the network-assisting information includes a cost associated with each CCS and each associated RAT.

Example 20 may include the subject matter of Example 15, wherein the CCS is one of a picocell, femtocell, microcell, or macrocell.

Example 21 may include the subject matter of Example 15, wherein the RATs are selected from a group consisting of 4G, Long-term evolution (LTE), WiFi, and 3G.

Example 22 is one or more computer-readable media having instructions embodied thereon, which, when executed by one or more processors of a user device provides the user device with a selection module to: receive partition information from a controller of a heterogeneous wireless network, wherein the partition information is calculated to improve one or more utility metrics of the heterogeneous wireless network; select, based at least in part upon the partition information, a cooperating cell station (CCS) and corresponding radio access technology (RAT) with which to connect to the heterogeneous wireless network; and establish a connection with the selected CCS via the corresponding RAT.

Example 23 may include the subject matter of Example 22, wherein the partition information comprises assignment of the user device to a CCS and an associated RAT.

Example 24 may include the subject matter of Example 22, wherein the partition information comprises network-assisting information to enable the user devices to select a CCS and an associated RAT.

Example 25 may include the subject matter of Example 24, wherein the network-assisting information includes a cost associated with each CCS and each associated RAT of the heterogeneous network.

Example 26 is an apparatus comprising: means for receiving partition information from a controller of a heterogeneous wireless network, wherein the partition information is calculated to improve one or more utility metrics of the heterogeneous wireless network; means for selecting, based at least in part upon the partition information, a cooperating cell station (CCS) and corresponding radio access technology (RAT) with which to connect to the heterogeneous wireless network; and means for establishing a connection with the selected CCS via the corresponding RAT.

Example 27 may include the subject matter of Example 26, wherein the partition information comprises assignment of the user device to a CCS and an associated RAT.

Example 28 may include the subject matter of Example 26, wherein the partition information comprises network-assisting information to enable the user devices to select a CCS and an associated RAT.

Example 29 may include the subject matter of Example 28, wherein the network-assisting information includes a cost associated with each CCS and each associated RAT of the heterogeneous network.

What is claimed is:

1. An apparatus for partitioning user devices comprising:
a wireless transceiver; and
a control module coupled with the wireless transceiver, the control module to:
receive utility measurements from a plurality of cooperating cell stations (CCSs) of a heterogeneous wireless network, wherein the utility measurements are associated with a plurality of user devices that wirelessly connect to the plurality of CCSs;
determine, based upon the utility measurements, partition information that results in a partitioning of the user devices across the plurality of CCSs and a plurality of radio access technologies (RATs) associated with individual CCSs of the plurality of CCSs to improve one or more utility metrics of the heterogeneous wireless network, wherein at least one CCS of the plurality of CCSs is associated with at least two RATs of the plurality of RATs and the determination of the partitioning includes a selection of one RAT of the at least two RATs; and transmit the partition information to the user devices to partition the user devices.

2. The apparatus of claim 1, wherein the partition information comprises assignment of each user device to a CCS and an associated RAT.

3. The apparatus of claim 2, wherein the control module is to transmit the partition information to the user devices, through the plurality of CCSs, to partition the user devices.

4. The apparatus of claim 1, wherein the partition information comprises network-assisting information to enable individual user devices to select a CCS and an associated RAT to partition the user devices in accordance with the partitioning.

5. The apparatus of claim 4, wherein the network-assisting information includes a cost associated with each CCS and each associated RAT.

6. The apparatus of claim 1, wherein the one or more utility metrics are associated with one or more of channel quality, loading level, congestion level, and quality of service (QoS) requirements.

7. The apparatus of claim 1, wherein the one or more utility metrics are associated with increasing sum log throughput or increasing a minimum per user device throughput.

8. The apparatus of claim 1, wherein the CCSs are selected from a group consisting of a picocell, femtocell, microcell, or macrocell.

9. The apparatus of claim 1, wherein the RATs are selected from a group consisting of 4G, Long-Term Evolution (LTE), WiFi, and 3G.

10. A computer-implemented method to assign user devices in a heterogeneous wireless network comprising:
    transmitting, by a controller, a wireless signal to instruct a plurality of cooperating cell stations (CCS) of the heterogeneous wireless network to gather utility measurements associated with a plurality of user devices wirelessly connected to the plurality of CCS;
    receiving, by the controller, the utility measurements from the plurality of CCSs;
    determining, by the controller, based upon the utility measurements, assignments of individual user devices of the plurality of user devices to a corresponding CCS of the plurality of CCSs and a corresponding radio access technology (RAT) of an associated one or more RATs to improve one or more utility metrics of the heterogeneous wireless network, wherein at least one CCS of the plurality of CCSs is associated with at least two RATs of the one or more RATs and determining the assignments includes selecting one RAT of the at least two RATs; and
    transmitting, by the controller, the assignments to the plurality of user devices.

11. The method of claim 10, wherein the one or more utility metrics are associated with one or more of channel quality, loading level, congestion level, and quality of service (QoS) requirements.

12. The method of claim 10, wherein the one or more utility metrics are associated with increasing sum log throughput or increasing a minimum per user device throughput.

13. The method of claim 10, wherein the CCSs are selected from a group consisting of a picocell, femtocell, microcell, and macrocell.

14. The method of claim 10, wherein the RATs are selected from a group consisting of 4G, Long-Term Evolution (LTE), WiFi, and 3G.

15. A cooperating cell station (CCS) associated with at least two radio access technologies (RATs) of a plurality of RATs, the CCS comprising:
    a wireless transceiver; and
    a partition module coupled with the wireless transceiver, the partition module to:
    collect utility measurement information from one or more user devices wirelessly connected to the CCS via one or more of the plurality of RATs, the utility measurement information associated with one or more utility metrics of a heterogeneous wireless network (HetNet) to which the CCS is wirelessly connected;
    transmit the utility measurements to a controller of the HetNet to be combined with utility measurements from one or more other CCSs of the HetNet;
    receive, from the controller, partition information associated with the one or more user devices wirelessly connected to the CCS, wherein the partition information is to improve one or more utility metrics of the HetNet, and wherein the partition information is to indicate a selection of one RAT of the at least two RATs to be utilized by individual user devices of the one or more user devices; and
    forward the partition information to the one or more user devices.

16. The CCS of claim 15, wherein the CCS is further to monitor one or more radio links respectively connecting the CCS to the one or more user devices to enable the collection of utility measurements.

17. The CCS of claim 15, wherein the partition information comprises assignment of the one or more user devices to a CCS and an associated RAT of the heterogeneous network.

18. The CCS of claim 15, wherein the partition information comprises network-assisting information to enable the one or more user devices to select a CCS and an associated RAT to partition the user devices in accordance with the partitioning.

19. The CCS of claim 18, wherein the network-assisting information includes a cost associated with each CCS and each associated RAT.

20. The CCS of claim 15, wherein the CCS is one of a picocell, femtocell, microcell, or macrocell.

21. The CCS of claim 15, wherein the RATs are selected from a group consisting of 4G, Long-Term Evolution (LTE), WiFi, and 3G.

22. One or more non-transitory, computer-readable media having instructions embodied thereon, which, when executed by one or more processors of a user device provides the user device with a selection module to:
    receive partition information from a controller of a heterogeneous wireless network, wherein the partition information is calculated to improve one or more utility metrics of the heterogeneous wireless network;
    select, based at least in part upon the partition information, a cooperating cell station (CCS) and corresponding radio access technology (RAT) with which to connect to the heterogeneous wireless network, wherein the CCS is associated with at least two RATs and the selection includes a selection of one RAT of the at least two RATs; and
    establish a connection with the selected CCS via the corresponding RAT.

23. The one or more non-transitory, computer-readable media of claim 22, wherein the partition information comprises assignment of the user device to a CCS and an associated RAT.

24. The one or more non-transitory, computer-readable media of claim 22, wherein the partition information comprises network-assisting information to enable the user devices to select a CCS and an associated RAT.

25. The one or more non-transitory, computer-readable media of claim 24, wherein the network-assisting information includes a cost associated with each CCS and each associated RAT of the heterogeneous network.

* * * * *